United States Patent
Kunishi (10) Patent No.: US 9,819,367 B2
(45) Date of Patent: Nov. 14, 2017

(54) COMMUNICATION CIRCUIT

(71) Applicant: KABUSHIKI KAISHA TOSHIBA, Tokyo (JP)

(72) Inventor: Yugo Kunishi, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/233,697

(22) Filed: Aug. 10, 2016

(65) Prior Publication Data

US 2017/0257123 A1  Sep. 7, 2017

(30) Foreign Application Priority Data

Mar. 1, 2016 (JP) .................... 2016-039233

(51) Int. Cl.
| | |
|---|---|
| H04B 1/00 | (2006.01) |
| H04W 48/18 | (2009.01) |
| H04W 88/06 | (2009.01) |

(52) U.S. Cl.
CPC .......... *H04B 1/0053* (2013.01); *H04W 48/18* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 7,123,898 | B2 | 10/2006 | Burgener et al. |
| 7,613,442 | B1 | 11/2009 | Kelly et al. |
| 8,391,805 | B2 | 3/2013 | Ishimori et al. |
| 2007/0120103 | A1* | 5/2007 | Burgener ............. H01P 1/15 257/1 |
| 2014/0062614 | A1 | 3/2014 | Park |
| 2016/0164547 | A1* | 6/2016 | Kim ............. H04B 1/0057 455/266 |
| 2017/0134057 | A1* | 5/2017 | Kim ............. H04B 1/1018 |

FOREIGN PATENT DOCUMENTS

| | | |
|---|---|---|
| JP | 2000-294786 A | 10/2000 |
| JP | 2005-515657 A | 5/2005 |
| JP | 2009165077 A | 7/2009 |
| JP | 2012010246 A | 1/2012 |
| JP | 2012049962 | 3/2012 |
| JP | 5043690 B2 | 10/2012 |
| JP | 2014050098 | 3/2014 |
| JP | 2015115866 A | 6/2015 |

* cited by examiner

*Primary Examiner* — David Bilodeau
(74) *Attorney, Agent, or Firm* — Patterson & Sheridan, LLP (57) ABSTRACT

A communication circuit includes a first switch circuit having a first terminal at which a first signal of a first frequency can be input, a second terminal at which a second signal of a second frequency can be input, and a plurality of third terminals from which the first signal and the second signal can be output. A second switch circuit has a plurality fourth terminals corresponding to the plurality of third terminals and at which the first or second signal can be received from the first switch circuit, a fifth terminal at which the first signal can be output, and a sixth terminal at which the second signal can be output. Each fourth terminal is connectable to either of the fifth terminal and the sixth terminal.

20 Claims, 8 Drawing Sheets

FIG. 8

COMMUNICATION CIRCUIT

CROSS-REFERENCE TO RELATED APPLICATION

This application is based upon and claims the benefit of priority from Japanese Patent Application No. 2016-039233, filed Mar. 1, 2016, the entire contents of which are incorporated herein by reference.

FIELD

Embodiments described herein relate generally to communication circuits.

BACKGROUND

In radio communication devices such as mobile telephones, carrier aggregation is used to deal with an increase in data traffic. Carrier aggregation is one of the technologies that perform radio communication in different bands at the same time. In a radio communication device supporting carrier aggregation, various communication circuits are provided, such as a front-end circuit that is an antenna-side transmitting and receiving end circuit.

Carrier aggregation often uses bands which are separated from each other, but nearby or adjacent bands may be used in the future. However, since communication bands are typically subdivided according to various circumstances of individual countries and telecommunications carriers, there are numerous combinations of nearby bands to account for in a carrier aggregating system. For example, if the front-end circuit were provided for each possible combination of nearby bands, the required circuit would increase in size.

DETAILED DESCRIPTION

In general, according to one embodiment, a communication circuit comprises a first switch circuit having a first terminal at which a first signal of a first frequency can be input, a second terminal at which a second signal of a second frequency can be input, and a plurality of third terminals from which the first signal and the second signal can be output. A second switch circuit is provided and has a plurality fourth terminals, corresponding to the plurality of third terminals and at which the first or second signal can be received from the first switch circuit, a fifth terminal at which the first signal can be output, and a sixth terminal at which the second signal can be output. Each fourth terminal is connectable to either of the fifth terminal and the sixth terminal.

Hereinafter, example embodiments will be described with reference to the drawings, but the present disclosure is not limited to these example embodiments.

First Embodiment

Figure 1:
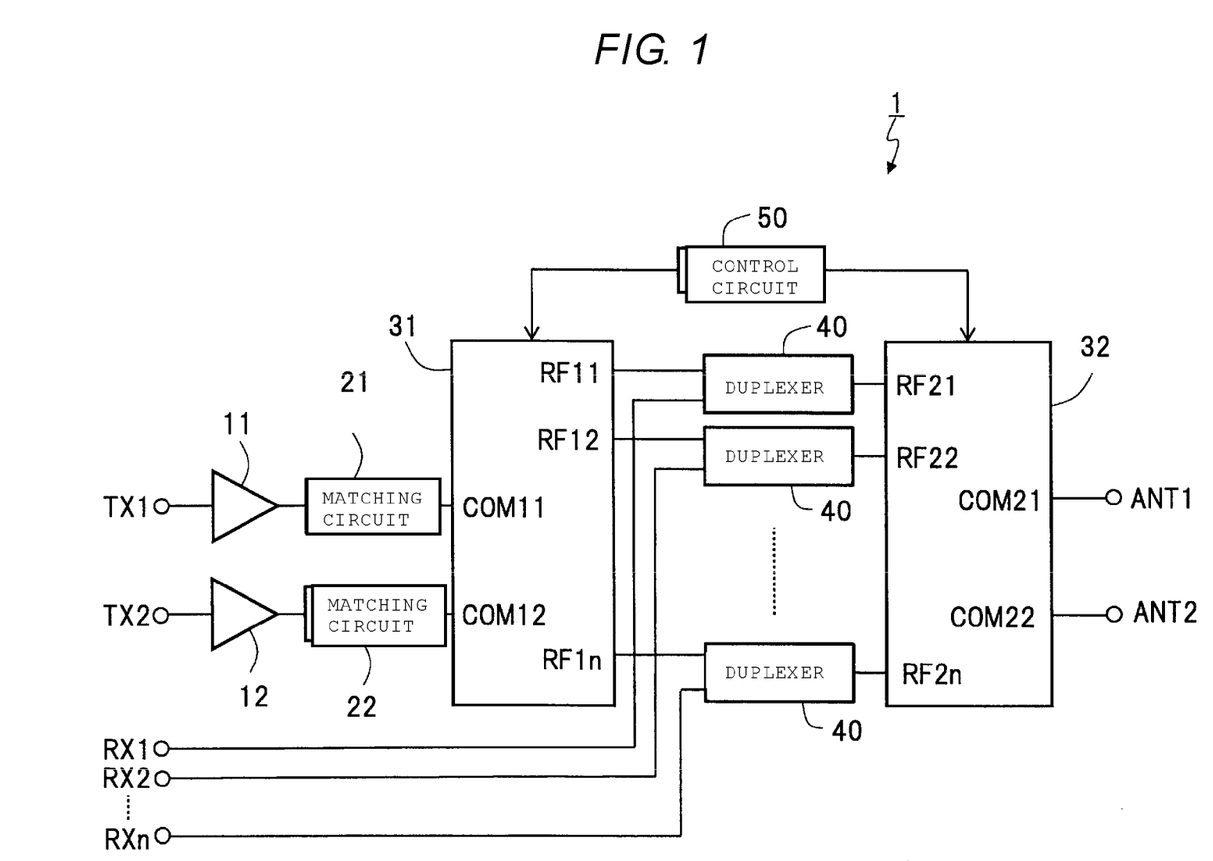
FIG. 1 is a block diagram depicting a communication circuit according to a first embodiment.

FIG. 1 is a block diagram of a communication circuit according to a first embodiment. A communication circuit 1 is applied to a front-end circuit. This front-end circuit is provided in a radio communication device that performs carrier aggregation by using a first antenna ANT1 and a second antenna ANT2.

The communication circuit 1 includes power amplifiers 11 and 12, matching circuits 21 and 22, a first switch circuit 31, a second switch circuit 32, a plurality of duplexers 40, and a control circuit 50.

The power amplifier 11 amplifies a transmission signal input from a terminal TX1. The power amplifier 12 amplifies a transmission signal input from a terminal TX2. The terminal TX1 and the terminal TX2 are connected to a transmitting circuit (not specifically depicted in the drawing) which generates the above-described transmission signals. The signal frequency which the power amplifier 11 can amplify and the signal frequency which the power amplifier 12 can amplify are close to each other.

The matching circuit 21 is provided between the power amplifier 11 and the first switch circuit 31 and matches the output impedance of the power amplifier 11 to the input impedance of the first switch circuit 31. The matching circuit 22 is provided between the power amplifier 12 and the first switch circuit 31 and matches the output impedance of the power amplifier 12 to the input impedance of the first switch circuit 31.

Figure 2:
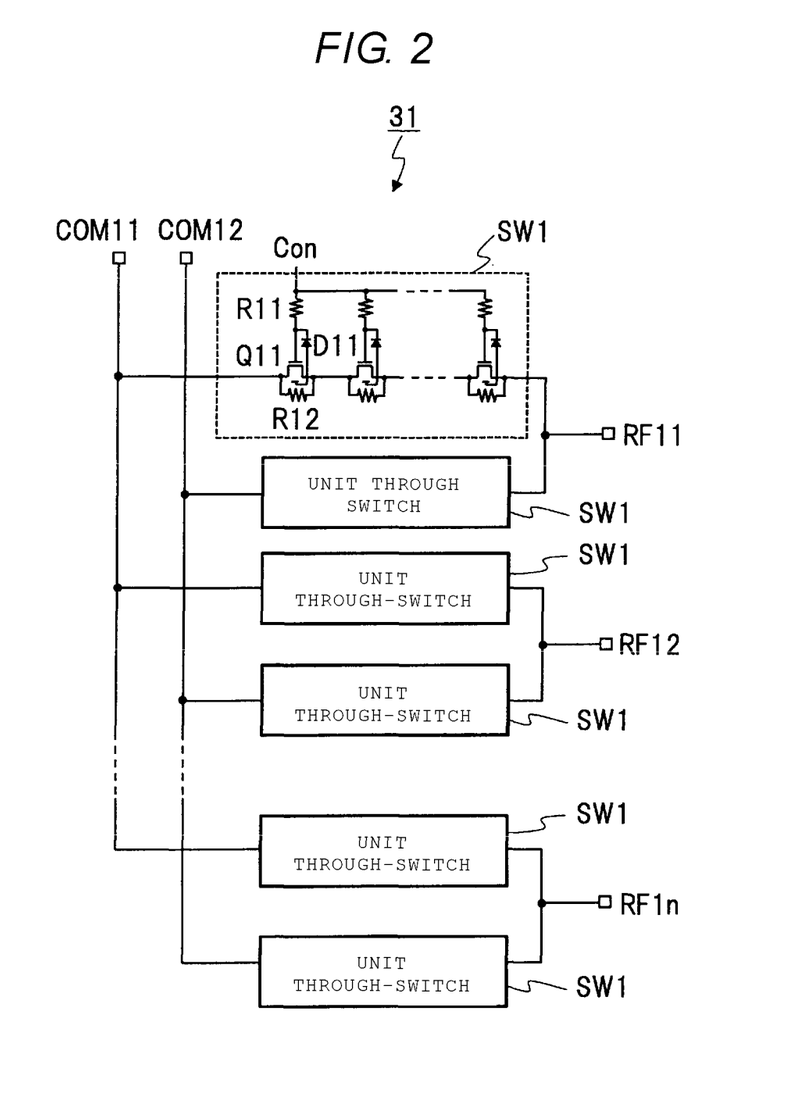
FIG. 2 is a circuit diagram depicting a first switch circuit.

FIG. 2 is a circuit diagram depicting the schematic configuration of the first switch circuit 31. As depicted in FIG. 2, the first switch circuit 31 is formed as a double-pole n-throw (DPnT) circuit that allows n outputs to be produced for two inputs. Specifically, the first switch circuit 31 includes a first terminal COM11, a second terminal COM12, a plurality of third terminals RF11 to RF1$n$ (where n is an integer greater than or equal to three), and a plurality of unit through-switches SW1.

The first terminal COM11 is connected to the power amplifier 11 via the matching circuit 21 (see FIG. 1). A first signal set to a first frequency is input to the first terminal COM11. The first signal corresponds to a signal obtained by subjecting the transmission signal input at the terminal TX1 to amplification processing in the power amplifier 11 and then to impedance matching processing in the matching circuit 21.

The second terminal COM12 is connected to the power amplifier 12 via the matching circuit 22 (see FIG. 1). A second signal set to a second frequency is input to the second terminal COM12. The second signal corresponds to a signal obtained by subjecting the transmission signal input at the terminal TX2 to amplification processing in the power amplifier 12 and then to impedance matching processing in the matching circuit 22. Here, the second frequency is close to the first frequency.

The plurality of third terminals RF11 to RF1$n$ correspond to a plurality of signal frequencies including the above-described first frequency and second frequency. For example, if the third terminal RF11 corresponds to the first frequency and the third terminal RF12 corresponds to the second frequency, the first signal is output from the third terminal RF11 and the second signal is output from the third terminal RF12.

Each unit through-switch SW1 is a minimum structural unit circuit of the DPnT circuit and includes a plurality of first switching elements Q11, diodes D11, and resistors R11 and R12. The plurality of first switching elements Q11 are connected in series to the path of the first signal between the first terminal COM11 and the plurality of third terminals RF11 to RF1n. Moreover, the plurality of first switching elements Q11 are also connected in series to the path of the second signal between the second terminal COM12 and the plurality of third terminals RF11 to RF1n.

Each first switching element Q11 is formed of an N-type metal oxide semiconductor field-effect transistor (MOSFET). Each diode D11 is provided between the body and the gate of each first switching element Q11. Each resistor R11 is connected to the gate of each first switching element Q11. Each resistor R12 is connected between the drain and the source of each first switching element Q11.

Figure 3:
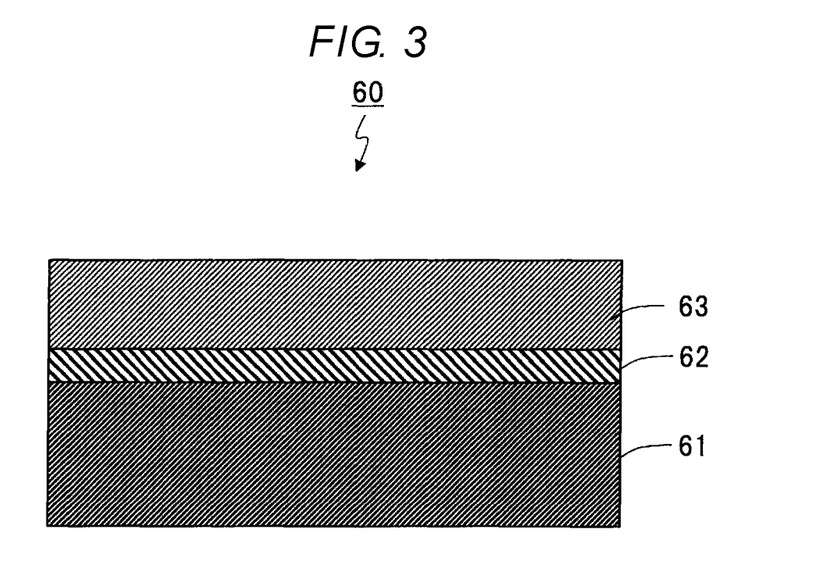
FIG. 3 is a cross-sectional view depicting a substrate on which the first switch circuit is provided.

FIG. 3 is a cross-sectional view depicting the structure of a substrate on which the first switch circuit 31 is provided. A substrate 60, as depicted in FIG. 3, is a silicon-on-insulator (SOI) substrate. Specifically, the substrate 60 includes a silicon substrate 61, an insulating layer 62 provided on the silicon substrate 61, and a silicon layer 63 provided on the insulating layer 62. The first switch circuit 31 is provided on this silicon layer 63. In the first embodiment, the second switch circuit 32 is also provided on the silicon layer 63. That is, the first switch circuit 31 and the second switch circuit 32 are provided on the same substrate 60.

Figure 4:
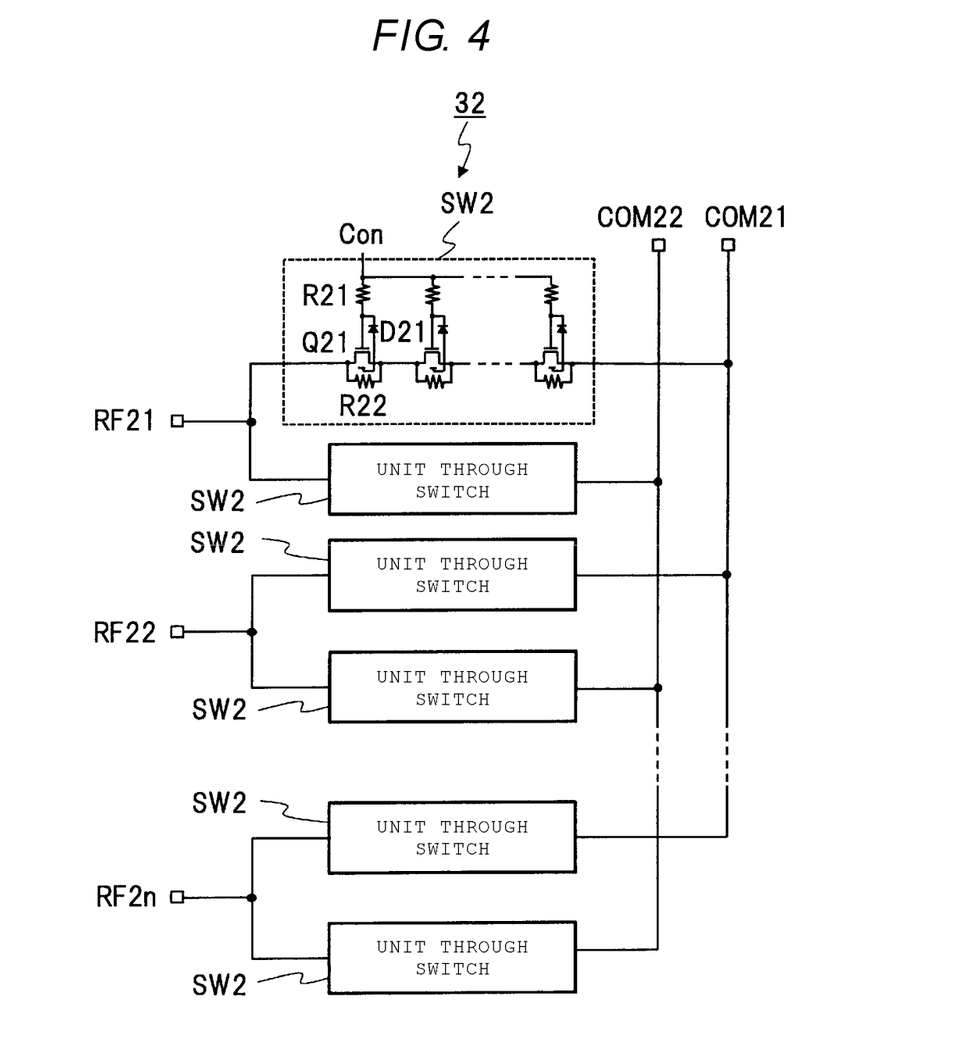
FIG. 4 is a circuit diagram depicting a second switch circuit.

FIG. 4 is a circuit diagram depicting the schematic configuration of the second switch circuit 32. The second switch circuit 32, as depicted in FIG. 4, includes a plurality of fourth terminals RF21 to RF2n, a fifth terminal COM21, a sixth terminal COM22, and a plurality of unit through-switches SW2.

The plurality of fourth terminals RF21 to RF2n are connected to the plurality of third terminals RF11 to RF1n, respectively, via duplexers 40 (see FIG. 1). The fifth terminal COM21 is connected to the first antenna ANT1. The sixth terminal COM22 is connected to the second antenna ANT2.

Each unit through-switch SW2 includes a plurality of second switching elements Q21, diodes D21, and resistors R21 and R22. The plurality of second switching elements Q21 are respectively connected in series to a path of the first signal and a path of the second signal between the plurality of fourth terminals RF21 to RF2n and the fifth terminal COM21 and between the plurality of fourth terminals RF21 to RF2n and the sixth terminal COM22.

Each second switching element Q21 is formed of an N-type MOSFET as is the case with the first switching element Q11. Each diode D21 is provided between the body and the gate of each second switching element Q21. Each resistor R21 is connected to the gate of each second switching element Q21. Each resistor R22 is connected between the drain and the source of each second switching element Q21.

Referring back to FIG. 1, the duplexers 40 are provided between the first switch circuit 31 and the second switch circuit 32. Each duplexer 40 receives the transmission signal (the first signal and the second signal) output from any one of the plurality of third terminals RF11 to RF1n to one of the plurality of fourth terminals RF21 to RF2n, the one corresponding to the third terminal which is the output source. At the same time, the duplexer 40 inputs the reception signal output from any one of the plurality of fourth terminals RF21 to RF2n to one of terminals RX to RXn, the one corresponding to the fourth terminal which is the output source. That is, the duplexer 40 switches a path of the transmission signal (the first signal and the second signal) and a path of the reception signal received by each of the first antenna ANT1 and the second antenna ANT2. The terminals RX to RXn are connected to a receiving circuit (not specifically depicted in the drawing) which processes the above-described reception signal.

The control circuit 50 controls the first switch circuit 31 and the second switch circuit 32. Specifically, the control circuit 50 controls the gate potential of the first switching elements Q11 and the gate potential of the second switching elements Q21 by a control signal Con.

For example, if the control circuit 50 outputs the control signal Con which controls the gate potential so as to be about 3 V, the first switching elements Q11 and the second switching elements Q21 are brought into conduction, in other words, brought into an ON state. Moreover, for example, if the control circuit 50 outputs the control signal Con which controls the gate potential so as to be about −3 V, the first switching elements Q11 and the second switching elements Q21 are brought out of conduction, in other words, brought into an OFF state.

In the communication circuit 1, configured as described above, it may be assumed here for purposes of explanation that, for example, the frequency which the power amplifier 11 can amplify is 700 to 800 MHz and the frequency which the power amplifier 12 can amplify is 800 to 900 MHz. In this case, as possible combinations for carrier aggregation, for example, a first combination of 700 MHz and 800 MHz, a second combination of 800 MHz and 900 MHz, and a third combination of 700 MHz and 900 MHz are conceivable. If the front-end circuits equal the number of possible combinations, the circuit increases in size.

In the first embodiment, however, the control circuit 50 controls the first switch circuit 31 and the second switch circuit 32 in accordance with the use of the first to third combinations. For example, if the first signal is set to 700 MHz and input to the first terminal COM11 and the second signal is set to 800 MHz and input to the second terminal COM12, the control circuit 50 brings the first switching elements Q11 provided on a path of the first signal which connects the first terminal COM11 and the third terminal RF11 into conduction and brings the other first switching elements Q11 provided on the other paths of the first signal out of conduction.

At the same time, the control circuit 50 brings the first switching elements Q11 provided on a path of the second signal which connects the second terminal COM12 and the third terminal RF12 into conduction and brings the other first switching elements Q11 provided on the other paths of the second signal out of conduction.

Moreover, if the above-described first signal is input to the fourth terminal RF21 corresponding to the third terminal RF11 and the above-described second signal is input to the fourth terminal RF22 corresponding to the third terminal RF12, the control circuit 50 brings the second switching elements Q21 provided on a path of the first signal which connects the fourth terminal RF21 and the fifth terminal COM21 into conduction and brings the other second switching elements Q21 provided on the other paths of the first signal out of conduction.

At the same time, the control circuit 50 brings the second switching elements Q21 provided on a path of the second signal which connects the fourth terminal RF22 and the sixth terminal COM22 into conduction and brings the other second switching elements Q21 provided on the other paths of the second signal out of conduction.

As for the second and third combinations, the control circuit 50 controls the first switch circuit 31 and the second switch circuit 32 in the same manner as in the case of the first combination described above. As a result, the two signals whose frequencies are close to each other are transmitted via one front-end circuit (communication circuit 1).

Incidentally, the frequency band which the communication circuit 1 can process is not limited to the above-described range and may be other frequency bands such as 1.7 to 1.9 GHz.

According to the first embodiment described above, two switch circuits are provided in one communication circuit and these switch circuits switch each of the paths of two signals whose frequencies are close to each other to a path corresponding to the frequency of each signal. Therefore, a small communication circuit that supports many combinations of nearby band communications can be provided.

Moreover, in the first embodiment, the above two switch circuits are formed on the same substrate. Therefore, since one control circuit can be used to control these switch circuits, the size of the circuit can be further reduced.

Furthermore, when the above-described substrate is an SOI substrate, since the two switch circuits and the control circuit that controls these switch circuits can be integrated on the same substrate, the area of the circuit can be reduced. In addition, since the parasitic capacitance and leakage of a high-frequency signal to the substrate are reduced by the use of the SOI substrate, the signal strength loss through each switch circuit is reduced and the output power of the power amplifier can be reduced. As a result, the size of the power amplifier can be reduced, whereby the power consumption of the radio communication device is reduced. When the radio communication device is driven by a battery, the size of this battery can also be reduced.

Second Embodiment

Figure 5:
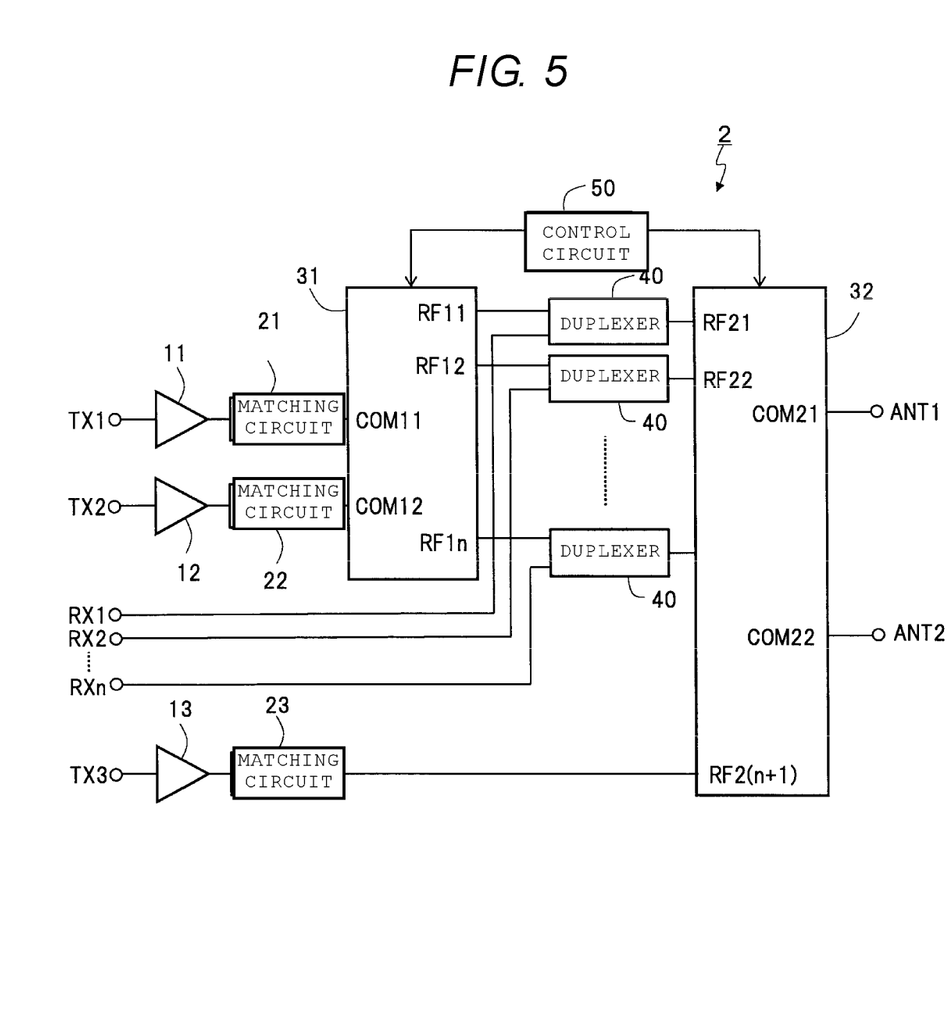
FIG. 5 is a block diagram depicting a communication circuit according to a second embodiment.

FIG. 5 is a block diagram depicting the configuration of a communication circuit according to a second embodiment. The component elements depicted in FIG. 5 that are substantially the same as the component elements of the communication circuit 1 are identified with the same reference characters and detailed explanations thereof are omitted.

As depicted in FIG. 5, in addition to the component elements of the communication circuit 1 of the first embodiment, a communication circuit 2 according to the second embodiment further includes a power amplifier 13 and a matching circuit 23. Moreover, in the communication circuit 2, the number of fourth terminals RF21 to RF2($n$+1) of the second switch circuit 32 is greater than the number of third terminals RF11 to RF1$n$ of the first switch circuit 31.

The power amplifier 13 amplifies a transmission signal input at a terminal TX3. The terminal TX3 is connected to a transmitting circuit (not specifically depicted in the drawing) which generates this transmission signal. The matching circuit 23 is provided between the power amplifier 13 and the second switch circuit 32 and matches the output impedance of the power amplifier 13 to the input impedance of the second switch circuit 32.

In the communication circuit 2 the transmission signal amplified by the power amplifier 13 is subjected to impedance matching in the matching circuit 23 and then input to the fourth terminal RF2($n$+1) of the second switch circuit 32.

According to the second embodiment, the power amplifier 13 may amplify a signal at a frequency which cannot be amplified by the power amplifier 11 or the power amplifier 12, thus not only carrier aggregation of frequency bands which are close to each other, but also carrier aggregation of frequency bands which are away from each other can be performed. Moreover, when the power amplifier 13 amplifies a signal supporting previous generation communications standards which the power amplifier 11 and the power amplifier 12 cannot deal with, the communication circuit 2 can be applied to both older and new forms of radio communications.

Furthermore, the signal amplified by the power amplifier 13 is directly input to the second switch circuit 32 without passing through the first switch circuit 31. Therefore, even when the power of this signal is greater than the power of the signal (the first signal and the second signal) which is input to the first switch circuit 31, the first switch circuit 31 is not required to have resistance to the power of this signal. Therefore, the area of the first switch circuit 31 can be reduced.

Incidentally, in the second embodiment, the number of fourth terminals RF21 to RF2($n$+1) of the second switch circuit 32 is greater than the number of third terminals RF11 to RF1$n$ of the first switch circuit 31. However, the number of third terminals RF11 to RF1$n$ of the first switch circuit 31 may be greater than the number of fourth terminals RF21 to RF2($n$+1) of the second switch circuit 32.

Figure 6:
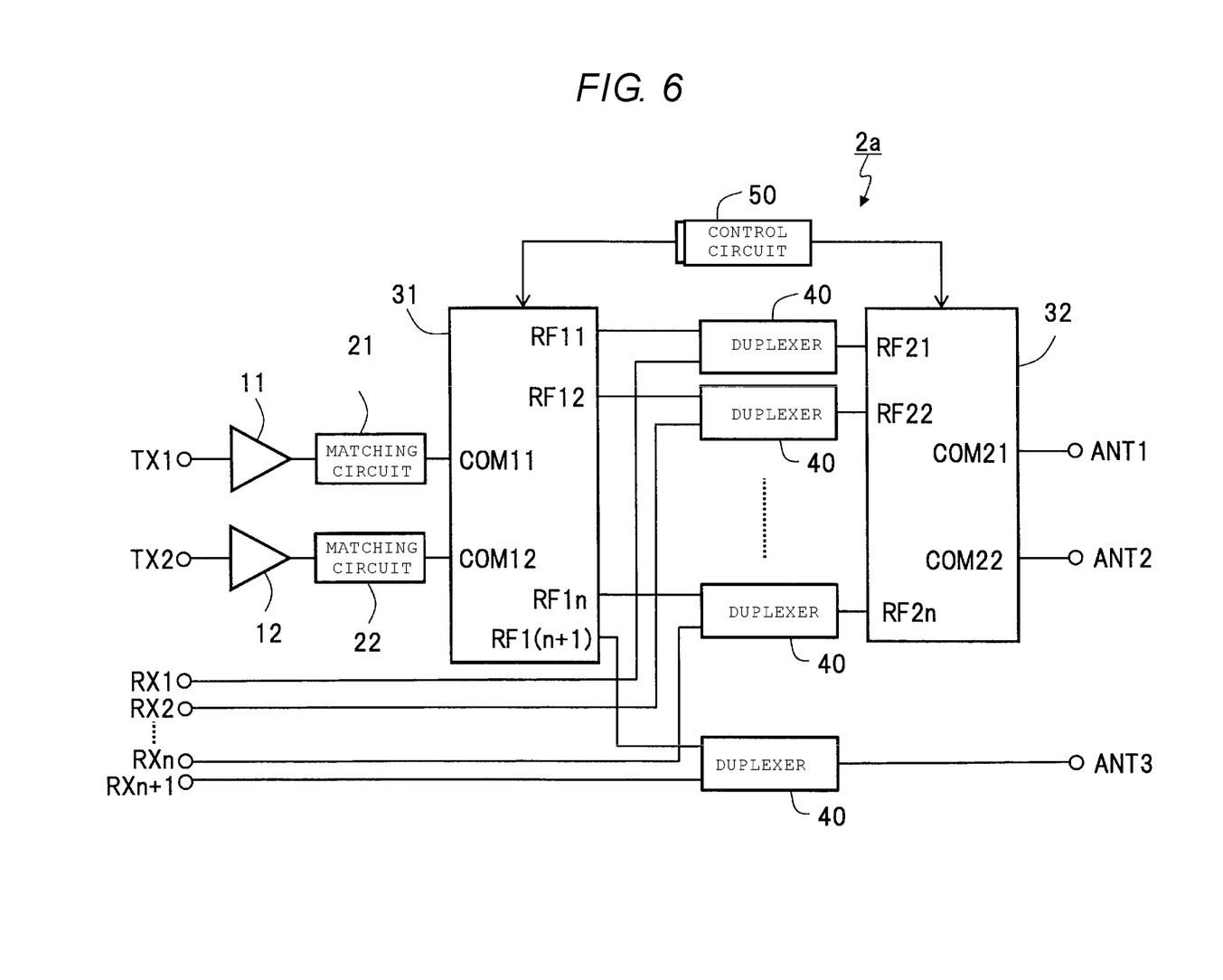
FIG. 6 is a block diagram depicting a communication circuit according to a modified example of the second embodiment.

FIG. 6 is a block diagram depicting the configuration of a communication circuit according to a modified example of the second embodiment. In a communication circuit 2$a$ depicted in FIG. 6, the number of third terminals RF11 to RF1($n$+1) of the first switch circuit 31 is greater than the number of fourth terminals RF21 to RF2$n$ of the second switch circuit 32.

In the communication circuit 2$a$, a signal output from the third terminal RF1 ($n$+1) is transmitted to a third antenna ANT3 without passing through the second switch circuit 32. Even when the power of this signal is high, in other words, even when the power of the signal transmitted and received by the third antenna ANT3 is higher than the power of the signal transmitted and received by each of the first antenna ANT1 and the second antenna ANT2, the second switch circuit 32 is not required to have resistance to the power of this signal. Therefore, the area of the second switch circuit 32 can be reduced.

Thus, by making the number of third terminals different from the number of fourth terminals, since the area of the first switch circuit 31 or the area of the second switch circuit 32 is reduced, the size of the communication circuit can be reduced.

Third Embodiment

Figure 7:
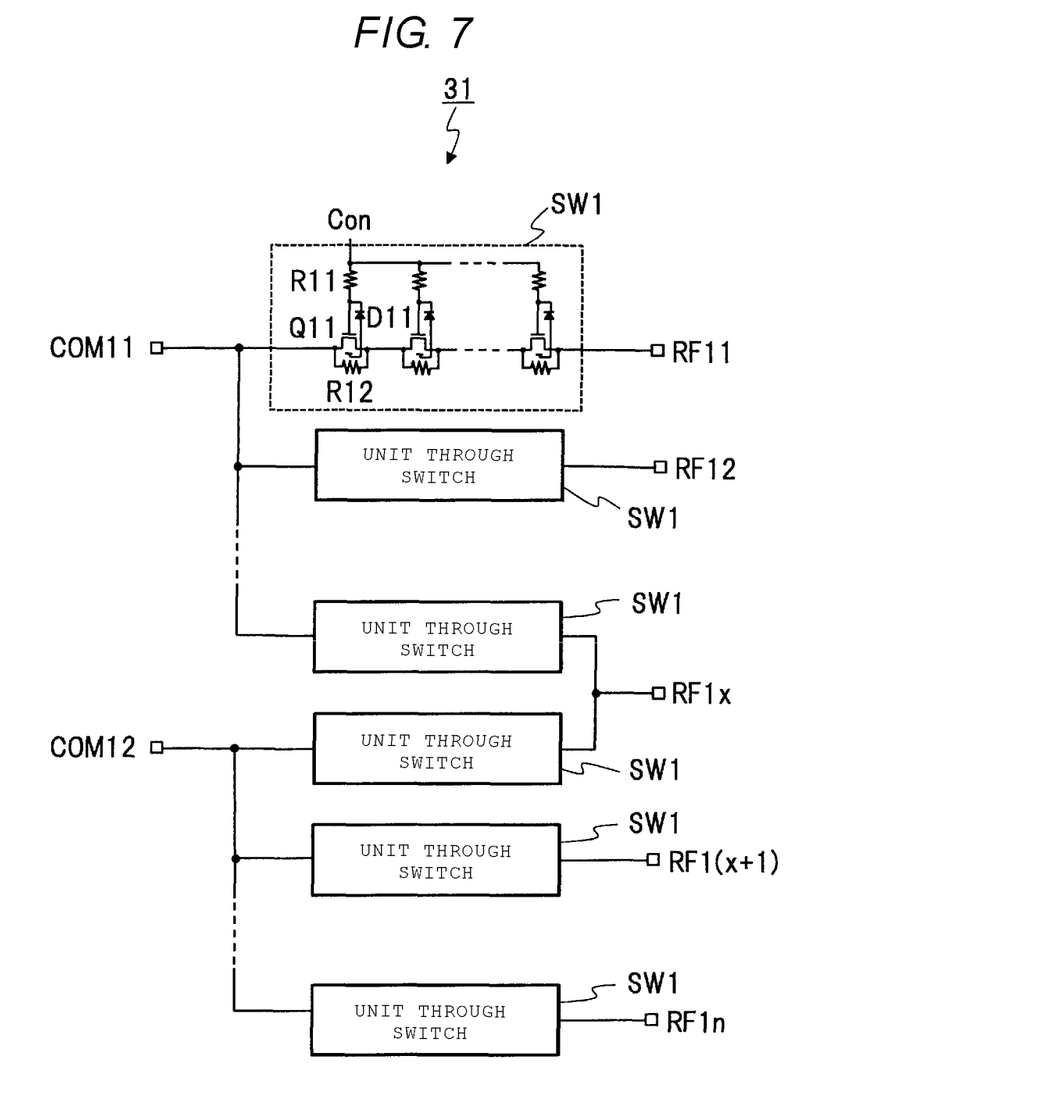
FIG. 7 is a circuit diagram depicting a first switch circuit provided in a communication circuit according to a third embodiment.
Figure 8:
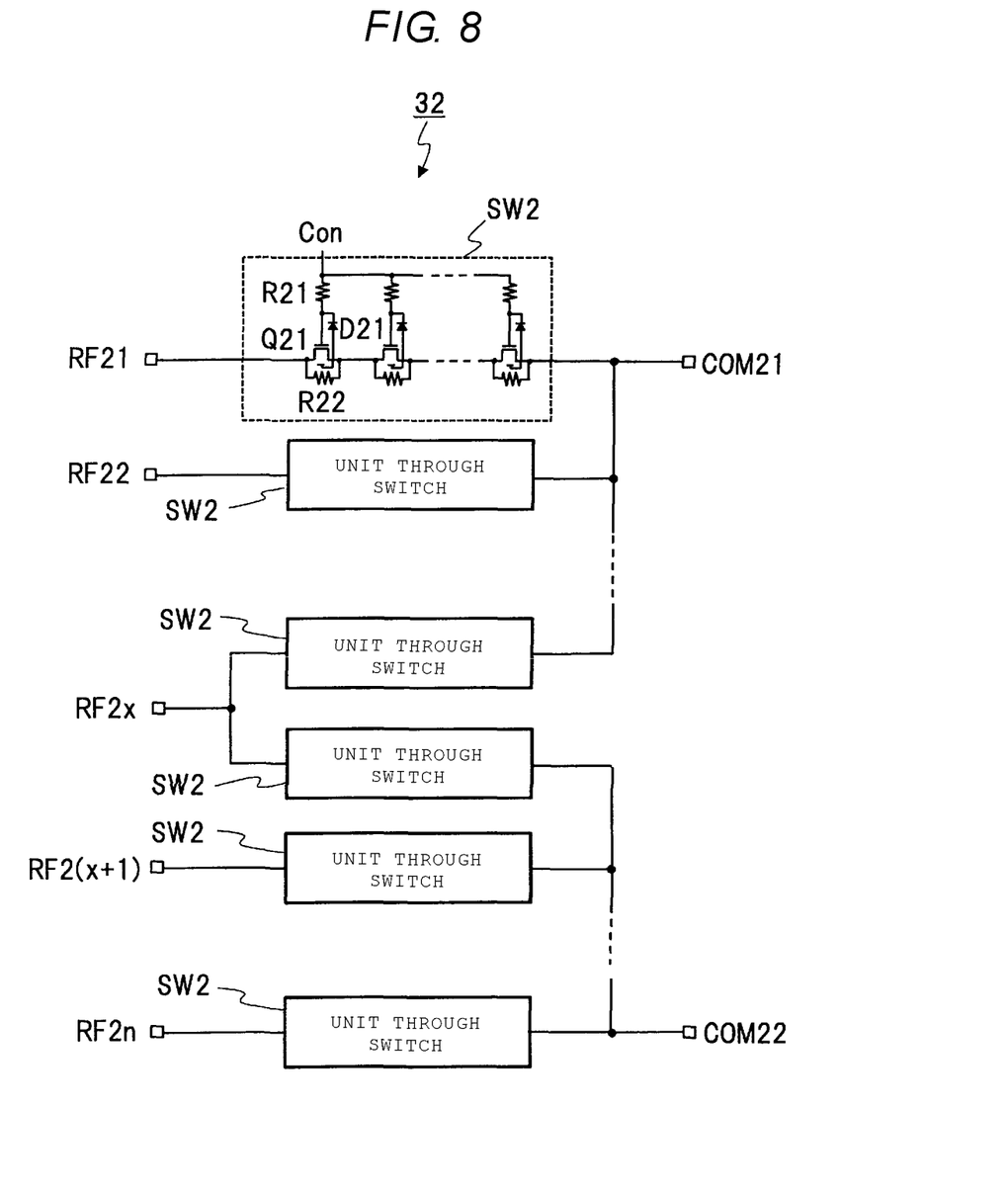
FIG. 8 is a circuit diagram depicting a second switch circuit provided in the communication circuit according to the third embodiment.

A third embodiment will be described. In the third embodiment, the configuration of the first switch circuit 31 and the configuration of the second switch circuit 32 are different from those configurations in the first embodiment.

FIG. 7 is a circuit diagram depicting the schematic configuration of a first switch circuit provided in a communication circuit according to the third embodiment. FIG. 8 is a circuit diagram depicting the schematic configuration of a second switch circuit provided in the communication circuit according to the third embodiment.

In the first switch circuit 31 depicted in FIG. 7, a terminal RF1x in the plurality of third terminals RF11 to RF1n is connected to both the first terminal COM11 and the second terminal COM12 via the unit through-switches SW1, and the other terminals are connected to one of the first terminal COM11 or the second terminal COM12 via the unit through-switch SW1.

Likewise, also in the second switch circuit 32 depicted in FIG. 8, a terminal RF2x in the plurality of fourth terminals RF21 to RF2n is connected to both the fifth terminal COM21 and the sixth terminal COM22 via the unit through-switches SW2, and the other terminals are connected to one of the fifth terminal COM21 or the sixth terminal COM22 via the unit through-switch SW2.

According to the third embodiment described above, the first switch circuit 31 limits the number of third terminals which can be connected to both the first terminal COM11 and the second terminal COM12. Likewise, the second switch circuit 32 limits the number of fourth terminals which can be connected to both the fifth terminal COM21 and the sixth terminal COM22. Therefore, in the third embodiment, as compared to the first embodiment, the numbers of unit through-switches SW1 and SW2 are reduced. As a result, since both the area of the first switch circuit 31 and the area of the second switch circuit 32 are reduced, the size of the entire communication circuit can be reduced.

Furthermore, since the number of unit through-switches which are brought out of conduction is reduced, the off capacitance of the first switch circuit 31 and the off capacitance of the second switch circuit 32 are reduced and the signal losses through these switch circuits are reduced. As a result, the sizes of the power amplifiers 11 and 12 can be reduced. Moreover, when the radio communication device is driven by a battery, the size of this battery can also be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication circuit, comprising:
    a first switch circuit having a first terminal at which a first signal at a first frequency can be input, a second terminal at which a second signal at a second frequency can be input, and a plurality of third terminals from which the first signal and the second signal can be output; and
    a second switch circuit having a plurality fourth terminals corresponding to the plurality of third terminals and at which the first or second signal can be received from the first switch circuit, a fifth terminal at which the first signal can be output, and a sixth terminal at which the second signal can be output, each fourth terminal being connectable to either of the fifth terminal and the sixth terminal.

2. The communication circuit according to claim 1, wherein
    the first switch circuit includes a first plurality of first switching elements which are connected between the first terminal and the plurality of third terminals, and a second plurality of first switching elements which are connected between the second terminal and the plurality of third terminals; and
    the second switch circuit includes a first plurality of second switching elements which are connected between the plurality of fourth terminals and the fifth terminal, and a second plurality of second switching elements which are connected between the plurality of fourth terminals and the sixth terminal.

3. The communication circuit according to claim 1, wherein a total number of third terminals in the plurality of third terminals is different from a total number of fourth terminals in the plurality of fourth terminals.

4. The communication circuit according to claim 1, wherein
    the first switch circuit includes a first plurality of first switching elements connected between the first terminal and a first part of the plurality of third terminals and a second plurality of first switching elements connected between the second terminal and a second part of the plurality of third terminals, and at least one third terminal in the plurality of third terminals is connected to both a first switching element in the first plurality of first switching elements and a first switching element in the second plurality of first switching elements; and
    the second switch circuit includes a first plurality of second switching elements connected between the fifth terminal and a first part of the plurality of fourth terminals and a second plurality of second switching elements connected between the sixth terminal and a second part of the plurality of fourth terminals, and at least one fourth terminal in the plurality of fourth terminals is connected to both a second switching element in the first plurality of second switching elements and a second switching element in the second plurality of second switching elements.

5. The communication circuit according to claim 4, further comprising:
    a control circuit configured to switch the first and second pluralities of first switching elements to connect the first terminal to one third terminal in the plurality of third terminals and the second terminal to another third terminal in the plurality of third terminals and to switch the first and second pluralities of the second switching elements to connect one fourth terminal in the plurality of fourth terminals corresponding to the one third terminal to the fifth terminal and another fourth terminal in the plurality of fourth terminals corresponding the other third terminal to the sixth terminal.

6. The communication circuit according claim 1, further comprising:
    a substrate on which the first switch circuit and the second switch circuit are disposed, wherein the substrate is a silicon-on-insulator substrate.

7. The communication circuit according claim 1, further comprising:
    a plurality of first duplexers between the first switch circuit and the second switch circuit, each first duplexer configured to switch between connecting one of the plurality of fourth terminals to one of the plurality of third terminals and connecting the one of the plurality of fourth terminals to a seventh terminal at which incoming signals received at the fifth or sixth terminals can be output.

8. The communication circuit according to claim 7, further comprising:

a second duplexer between the first switch circuit and an eighth terminal at which the first or second signals can be output and incoming signals can be received, the second duplexer configured to switch between connecting one of the plurality of third terminal to the eighth terminal and connecting the eighth terminal to a ninth terminal at which the incoming signals received at the eighth terminal can be output.

9. The communication circuit according to claim 1, further comprising:
a seventh terminal at which a third signal of a third frequency can be input, the seventh terminal connected to an eighth terminal on the second switch circuit, the eighth terminal being connectable to either of the fifth terminal and the sixth terminal.

10. The communication circuit according to claim 1, further comprising:
a control circuit configured to control the first switch circuit so as to connect the first terminal to a first third terminal in the plurality of third terminals and to connect the second terminal to a second third terminal in the plurality of third terminals and to control the second switch circuit so as to connect a first fourth terminal in the plurality of fourth terminals that corresponds to the first third terminal to the fifth terminal and to connect a second fourth terminal in the plurality of fourth terminals that corresponds the second third terminal to the sixth terminal.

11. A communication circuit, comprising:
a first switch circuit having:
a first terminal to which a first signal of a first frequency can be input,
a second terminal to which a second signal of a second frequency can be input, and
a plurality of third terminals from which the first signal and the second signal can be individually output, the first switch circuit being configured to make a first connection between the first terminal and a first one of the third terminals in the plurality, and a second connection between the second terminal and a second one of the third terminals in the plurality; and
a second switch circuit having:
a plurality of fourth terminals that are each respectively connected to a one of the plurality of third terminals,
a fifth terminal connectable to a first antenna, and
a sixth terminal connectable to a second antenna, the second switch circuit being configured to make a third connection between a first one of the plurality of fourth terminals and the fifth terminal, and a fourth connection to a second one of the plurality of fourth terminals and the sixth terminal.

12. The communication circuit according to claim 11, further comprising:
a plurality of first duplexers between the plurality of third terminals and the plurality of fourth terminals, each first duplexer configured to switch between connecting one of the plurality of fourth terminals and one of the plurality of third terminals and connecting the one of the plurality of fourth terminals and a one of a plurality of seventh terminals at which incoming signals received at the fifth or sixth terminals can be output.

13. The communication circuit according to claim 12, further comprising:
a second duplexer between the first switch circuit and an eighth terminal at which the first or second signals can be output and incoming signals can be received, the second duplexer configured to switch between connecting the eighth terminal and one of the plurality of third terminals and connecting the eighth terminal and one of a plurality ninth terminals at which the incoming signals received at the eighth terminal can be output.

14. The communication circuit according to claim 11, further comprising:
a control circuit configured to control the first switch circuit to connect the first terminal to one of the plurality of third terminals and the second terminal to another of the plurality of third terminals and control the second switch circuit to connect one fourth terminal in the plurality of fourth terminals corresponding to the one of the plurality of third terminals to the fifth terminal and a second fourth terminal in the plurality of fourth terminals corresponding to the other one of the plurality of third terminals to the sixth terminal.

15. The communication circuit according to claim 11, wherein
the first switch circuit includes a first plurality of first switching elements which are connected between the first terminal and the plurality of third terminals, and a second plurality of first switching elements which are connected between the second terminal and the plurality of third terminals; and
the second switch circuit includes a first plurality of second switching elements which are connected between the plurality of fourth terminals and the fifth terminal, and a second plurality of second switching elements which are connected between the plurality of fourth terminals and the sixth terminal.

16. The communication circuit according to claim 11, wherein a total number of third terminals in the plurality of third terminals is different from a total number of fourth terminals in the plurality of fourth terminals.

17. The communication circuit according to claim 11, wherein
the first switch circuit includes a first plurality of first switching elements connected between the first terminal and a first part of the plurality of third terminals and a second plurality of first switching elements connected between the second terminal and a second part of the plurality of third terminals, and at least one third terminal in the plurality of third terminals is connected to both a first switching element in the first plurality of first switching elements and a first switching element in the second plurality of first switching elements, and
the second switch circuit includes a first plurality of second switching elements connected between the fifth terminal and a first part of the plurality of fourth terminals and a second plurality of second switching elements connected between the sixth terminal and a second part of the plurality of fourth terminals, and at least one fourth terminal in the plurality of fourth terminals is connected to both a second switching element in the first plurality of second switching elements and a second switching element in the second plurality of second switching elements.

18. A communication circuit, comprising:
a first transmission terminal at which a signal for transmission can be input;
a second transmission terminal at which a signal for transmission can be input;
a first antenna terminal through which a signal can be transmitted or received;
a second antenna terminal through which a signal can be transmitted or received;

a plurality of reception terminals at which a signal received through the first or second antenna terminals can be output;

a first switch circuit including switching elements through which the first and second transmission terminals can be connected to any one of a plurality of first switch output terminals; and a second switch circuit including a plurality of second switch input terminals respectively corresponding to one of the plurality of first switch output terminals, the second switch circuit including switching elements through which any one of the plurality of second switch input terminals can be connected to the first or second antenna terminal.

19. The communication circuit according to claim 18, further comprising:

a third transmission terminal at which a signal for transmission can be input, the third transmission terminal being connectable to a second switch input terminal not in the plurality of input terminals respectively corresponding to one of the plurality of first switch output terminals, the second switch circuit including switching elements through which the second input terminal can be connected to the first or second antenna terminal.

20. The communication circuit according to claim 18, further comprising:

a third antenna terminal through which a signal can be transmitted or received; and a duplexer configured to selectively connect the third antenna terminal to one first switch output terminal in the plurality of first switch output terminals and one reception terminal in the plurality of reception terminals.

* * * * *